United States Patent [19]
Fielder et al.

[11] Patent Number: 6,105,133
[45] Date of Patent: Aug. 15, 2000

[54] BILATERAL AUTHENTICATION AND ENCRYPTION SYSTEM

[75] Inventors: Guy L. Fielder, Houston; Paul N. Alito, Austin, both of Tex.

[73] Assignee: The PACid Group, Austin, Tex.

[21] Appl. No.: 09/219,967

[22] Filed: Dec. 23, 1998

Related U.S. Application Data

[63] Continuation of application No. 08/813,457, Mar. 10, 1997, abandoned, application No. 08/815,403, Mar. 10, 1997, and application No. 08/813,459, Mar. 10, 1997, Pat. No. 5,963, 696, which is a continuation of application No. 08/813,992, Mar. 10, 1997, abandoned.

[51] Int. Cl.$^7$ ........................................................ H04L 9/32
[52] U.S. Cl. ........................... 713/169; 713/165; 713/171; 380/283
[58] Field of Search .............................. 380/25; 713/169, 713/165, 171, 283

[56] References Cited

U.S. PATENT DOCUMENTS

| | | | |
|---|---|---|---|
| 4,218,738 | 8/1980 | Matyas et al. | 380/25 |
| 4,310,720 | 1/1982 | Check, Jr. | 380/25 |
| 4,649,233 | 3/1987 | Bass et al. | 380/21 |

*Primary Examiner*—Gilberto Barrón, Jr.
*Attorney, Agent, or Firm*—Gerald E. Lester

[57] ABSTRACT

A bilateral system for authenticating remote transceiving stations through use of station identifiers (IDs), and through use of passwords which are used only one time, and thereafter exchanging messages through use of an encryption key which is changed after each system connection. Upon authentication, each of the stations independently creates a secret session encryption key in response to the other station's unique station identifier that is exchanged over a communication link in cleartext. The station identifiers are used as tags to look up a unique static secret and a unique dynamic secret which are known only by the two stations, but which are not exchanged over the communication link. The secrets are independently combined by a bit-shuffle algorithm, the result of which is applied to a secure hash function to produce a message digest. The secret session encryption key, a one-time password for the originating station, a one-time password for the receiving station, and a pseudo-random change value for updating the dynamic secret are derived from the message digest. The dynamic secret is updated by the pseudo-random change value and a prime constant after each system connection, thus causing the message digest to be updated upon the occurrence of a new system connection. Further, the system IDs also may be altered by a component of the message digest upon the occurrence of a new system connection to provide an additional protection against playback impersonation.

27 Claims, 6 Drawing Sheets

BILATERAL AUTHENTICATION AND ENCRYPTION SYSTEM

RELATED APPLICATIONS

This application is a continuation of U.S. patent application Ser. No. 08/813,457 filed on Mar. 10, 1997 now abnd. Copending applications filed on the same date and having same inventors are "Bilateral Authentication And Information Encryption Token System And Method", Ser. No. 08/815,403; "File Encryption Method And System", Ser. No. 08/813,459; and "Secure Deterministic Encryption Key Generator System And Method", now U.S. Pat. No. 5,963,696 which is a continuation of 08/813,992 now abnd.

BACKGROUND OF THE INVENTION

When sensitive information is to be exchanged between transceiving stations, the originating station will be concerned that the information can be intercepted by an intentional act of an unauthorized party as the information travels over a communication medium between the stations, or that the message may inadvertently be received by an unauthorized receiving station.

Similar concerns arise when a party at a computer system located at a first station requests access to sensitive data files stored in a computer system located at a second station. In order to protect the files from unauthorized disclosure, the second station will be concerned whether the requesting party is authorized to access the files, and if authorized whether the information may be copied by a third party during transmission between stations.

The most widely accepted method of information protection over networks is the use of encryption, where the sending and receiving parties must share an encryption key to encrypt and decrypt the information being exchanged. In such systems, authentication is typically performed through cleartext exchanges, and the encryption keys that are used are changed infrequently as person-to-person exchanges are the only means to ensure that the encryption key can be shared without risking public exposure. As a result, valuable information and time are made available to an attacker who desires to discover the encryption key and gain access to all encrypted information which is exchanged over the networks.

Prior authentication and encryption systems are disclosed in U.S. Pat. Nos. 5,060,263; 5,065,429; 5,068,894; 5,153,919; 5,355,413; 5,361,062; 5,474,758; and 5,495,533. U.S. Pat. No. 5,060,263 employs a reversible encryption algorithm, conducts all exchanges between the host and client in cleartext, and provides only unilateral authentication. U.S. Pat. No. 5,065,429 provides only unilateral authentication, and stores its encryption keys on the storage medium where they would be accessible to any attacker reading the medium. U.S. Pat. No. 5,068,894 employs a reversible encryption algorithm which is never changed, and makes both cleartext challenges and encrypted responses available to an attacker. U.S. Pat. No. 5,153,919 provides useful cleartext information for an attacker in exchanges between stations, uses weak encryption algorithms to avoid latency problems, and does not provide for secure activation of the token as anyone who possesses it may use it. U.S. Pat. No. 5,355,413 encrypts a random challenge, but does not encrypt information exchanged between host and client. U.S. Pat. No. 5,361,062 exchanges information between host and client in cleartext, uses a reversible encryption algorithm, provides only unilateral authentication, triggers encryption iterations as a function of time which contributes to computer overhead and system latency, and requires a resynchronization protocol to keep token and host in sync. U.S. Pat. No. 5,474,758 provides only unilateral authentication, and depends upon the users ability to hide the storage of its certificate of authenticity. U.S. Pat. No. 5,495,533 provides only unilateral authentication, incurs a high network overhead contributing to latency, and depends upon a key directory which is susceptible to attacker intrusions.

Additional prior authentication systems are disclosed in U.S. Pat. Nos. 5,233,655; 5,367,572; 5,421,006; and 5,481,611. U.S. Pat. No. 5,233,655 provides only unilateral authentication, and does not provide any encryption of information that is being exchanged. U.S. Pat. No. 5,367,572 provides only unilateral authentication, requires a resynchronization protocol to keep the host and client in sync, and transmits all information exchanges in cleartext. U.S. Pat. No. 5,421,006 provides only unilateral authentication, and operates in a windowed environment which contributes substantially to CPU overhead and thus system latency. U.S. Pat. No. 5,481,611 provides only unilateral authentication, and conducts all information exchanges in cleartext. U.S. Pat. No. 5,309,516 requires that a key directory be stored.

None of the above prior art references disclose the use of dual many-to-few bit-mapping in generating a deterministic, non-predictable, and symmetric encryption key as used in the present invention.

In addition to the above disclosures, the use of secure hash algorithms (SHA) is disclosed in FIPS Pub. 180-1, Secure Hash Standard (Apr. 17, 1995); and token system security requirements are described in FIPS Pub. 140-1, Security Requirements For Cryptographic Modules (Jan. 11, 1994).

The present invention provides a combination of authentication and encryption in which parameters including system passwords, encryption keys, and change values that are used to alter a dynamic secret to produce new, pseudo-random system passwords and encryption keys, are used during only a single system connection before being replaced with new parameters having no known relationship with their previous counterparts, and both the originating system and the answering system in a network exchange independently generated passwords through use of an encryption key generator which employs bit-shuffling, many-to-few bit-mapping and secure hash processing to produce such parameters in a manner which is highly resistant to any attempt to discover the secret inputs to the encryption key generator through cryptographic analysis or brute force trial-and-error attacks. Further, the handshake protocol between the originating system and the answering system requires that only system identifiers be exchanged over a network in cleartext, and protects the encryption key generator, the system passwords, the encryption key, and the change value from public exposure. In addition, system IDs may be altered upon the completion of a system connection, or by request of one system to the other, to provide a further protection against playback impersonation by a would-be attacker.

SUMMARY OF THE INVENTION

In accordance with the present invention, one or more secrets are known by, but not exchanged between, the originating and answering systems. One secret is a static or constant secret, and the other is a dynamic secret in that it is independently changed by the originating and answering systems each time a system connection is completed or a new message digest is requested by one system to the other. More particularly, the two systems independently combine the static and dynamic secrets in accordance with a bit-shuffling algorithm employing a many-to-few bit-mapping, and the result is subjected to a secure hash process which also employs a many-to-few bit-mapping to produce a message digest. A one-time password for the originating system, a one-time password for the answering system, a secret session encryption key, and a change value for updating the dynamic secret are derived as bit length sectors from the message digest. Neither the secret session encryption key nor the change value is disclosed outside of a system in any form. The encryption key is used to encrypt the information to be transmitted. The one-time passwords are used to authenticate both the originating and the answering systems, and the change value is used to change the dynamic secret each time that a system connection is completed.

In one aspect of the invention, the dynamic secret which is used as an input to the bit-shuffling operation is updated each time that an authentication cycle for a system connection between the originating and answering systems occurs, and a new pseudo-random message digest thereafter is generated for a new system connection.

In another aspect of the invention, the authentication of originating and answering systems after each system connection ensures the updating of passwords and encryption keys, and the synchronization of the independent processes for generating the message digests from which the passwords and encryption keys are derived.

In yet another aspect of the invention, the binary length of the dynamic secret may be different than that of the static secret.

In still another aspect of the invention, the secret session encryption key is a deterministic, non-predictable, pseudo-random, symmetric encryption key which is changed after each system connection or upon the request of one system to the other.

In a further aspect of the invention, both the dynamic secret and the system IDs may be altered by a message digest component after all authentication cycles for a system connection are completed, or upon request of one system to the other, to provide added protection against playback impersonation by would-be attackers.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Preferred embodiments of the invention will now be described with reference to the accompanying drawings.

In the descriptions which follow, the terms "random", "pseudo-random", "connection" and "session" have the following meanings:

"Random" means a result which is non-predictable and non-repeating.

"Pseudo-random" means a result which is deterministic, but which appears to be random to an observer who has no access to or knowledge of the static and dynamic secrets producing the result.

"Connection" means the establishment of a communication link between an originating system and an answering system which lasts for the duration of one or more sessions.

"Session" means one or more exchanges of information between an originating system and an answering system to accomplish a task. There can be several sessions during a system connection. In accordance with the invention, keys and passwords are automatically changed after each system connection. Optionally, the key and/or passwords can be changed after each session.

Figure 1:
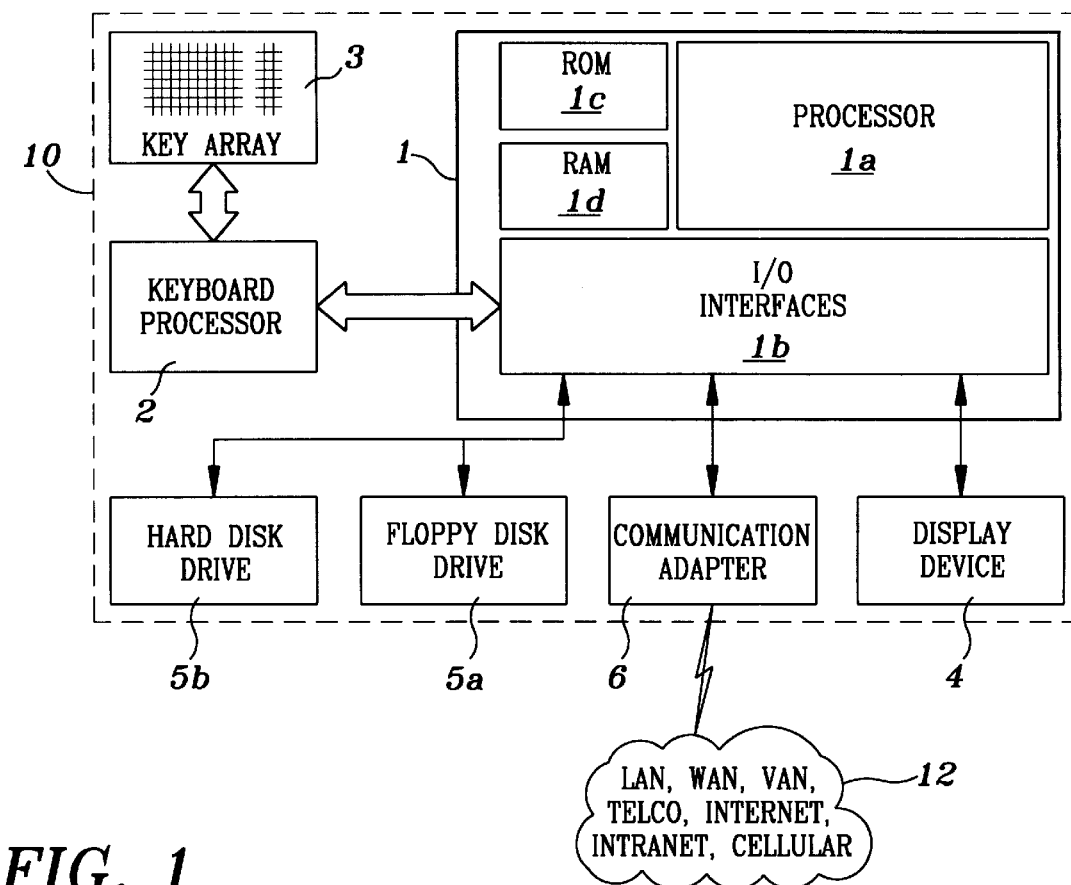
FIG. 1 is a functional block diagram of two computer systems communicating by way of a communications medium.
Figure 1:
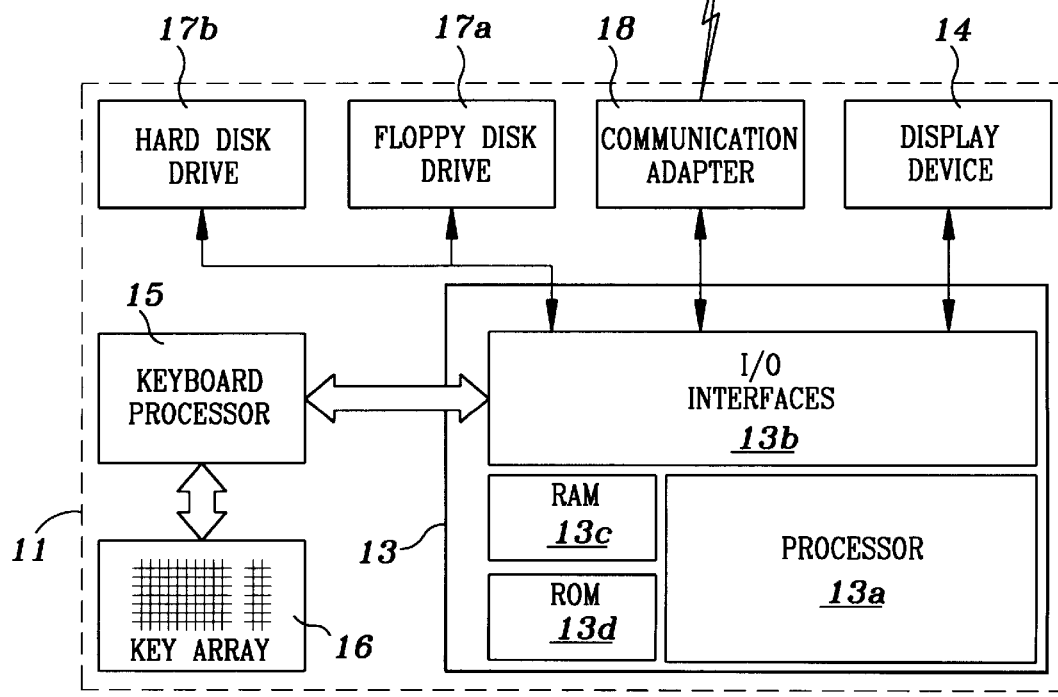

Referring to FIG. 1, a first computer system 10 is shown which communicates to a second computer system 11 by way of a communication link 12. The communication link may be a LAN (Local Area Network), WAN (Wide Area Network), VAN (Value Added Network), TELCO (Telephone Company switching network), the Internet, a local intranet, or an air link such as a cellular phone connection or other radio frequency transceiver interface.

The computer system 10 includes a central processing unit (CPU) 1 with I/O interfaces 1b leading to a keyboard processor 2 with a key matrix interface array 3. The CPU 1 further includes a processor 1a, a ROM 1c, and a RAM 1d. The computer system 10 in addition is comprised of a display device 4, a floppy disk drive 5a, a hard disk drive 5b, and a communication adapter 6, each of which is in electrical communication with I/O interfaces 1b. The communication adapter 6 in addition is in electrical communication with link 12.

The computer system 11 includes a CPU 13 that is comprised of a processor 13a, I/O interfaces 13b, a RAM 13c, and a ROM 13d. The I/O interfaces 13b are in electrical communication with a display device 14, a keyboard processor 15 having a key matrix interface array 16, a floppy disk drive 17a, a hard disk drive 17b, and a communication adapter 18 that is in electrical communication with link 12.

Processor 1a is used to execute the software algorithms and logic flows to perform the operation of the security system program. ROM 1c is necessary to get computer system 10 booted and operating (contains the code necessary to access the boot-sector). Key array 3 and display device 4 are used to support inter-operation between the computer and user. RAM 1d is used as a scratch pad, stack, or temporary storage of the values which are used by the program or operated on by the program. Hard disk drive 5b is a non-volatile memory for storing system IDs, shared secrets, and the executable code for this program. Floppy disk drive 5a can be used as removable non-volatile memory for storing system IDs and shared secrets.

In the operation of the invention as explained in detail below, system IDs, a static secret and a dynamic secret are stored on hard disk 5b of computer system 10, and are moved to RAM 1d by processor 1a when the originating and answering stations are being authenticated. Further, system passwords and the secret session encryption key are stored in the RAM 1d upon being generated during an authentication process. After each authentication and encryption information exchange, the RAM 1d is either overwritten by data generated during a next occurring session, or erased at the end of the current system connection; and the new dynamic secret (and optionally a new system ID) is written to the hard disk drive 5b.

In like manner in computer system 11, the system IDs, the static secret, and the dynamic secret are stored on hard disk drive 17b, and are moved to RAM 13c by processor 13a when the originating and answering stations are being authenticated. Further, system passwords and the secret session encryption key are stored in RAM 13c upon being generated during an authentication process. After each authentication and encrypted information exchange, the RAM 13c is either overwritten by data generated during a next occurring session, or erased at the end of the current system connection, and a new dynamic secret (and optionally a new system ID) is written into the hard disk drive 17b.

The secure hash algorithm and bit-shuffling algorithms used in the generation of a message digest, as explained in more detail below, are stored on hard disk drive 5b and hard disk drive 17b.

Information to be exchanged between computer system 10 and computer system 11 is transferred over communication link 12 between communication adapters 6 and 18 under the control of processors 1a and 13a, respectively.

In order to ensure that an exchange of information between computer system 10 and computer system 11 will remain confidential, a bilateral authentication of the computer systems and an encryption of the information exchange must occur.

In accordance with the invention, both computer system 10 and computer system 11 have a unique plural bit identifier, stored on their respective hard disk drives, which may be exchanged by the computer systems in cleartext. The identifiers may be comprised of numerics and/or text. The static secret is known by each system, but is not exchanged over the communication link. The static secret never changes unless the current value is purposely overwritten with a new value.

A dynamic secret also is shared by the two computer systems, and held in confidence, and never transmitted over the communication link 12. The secret is dynamic in the sense that each time a bilateral authentication of the computer systems occurs, the dynamic secret is changed. The change value that is used is a pseudo-random number. As will be explained in more detail below, the dynamic secret makes the cryptographic result of the encryption key generator unpredictable without knowledge of both the static secret and the dynamic secret. As one aspect of the invention, the change value is not made part of any access request or information that is exchanged between the computer systems. Thus, the change value is not subject to discovery as a result of information communicated over the communication link 12.

It is to be understood that the static secret, the dynamic secret, the change value, and the session encryption key are never communicated out from the computer system in which they are generated and stored.

Figure 2:
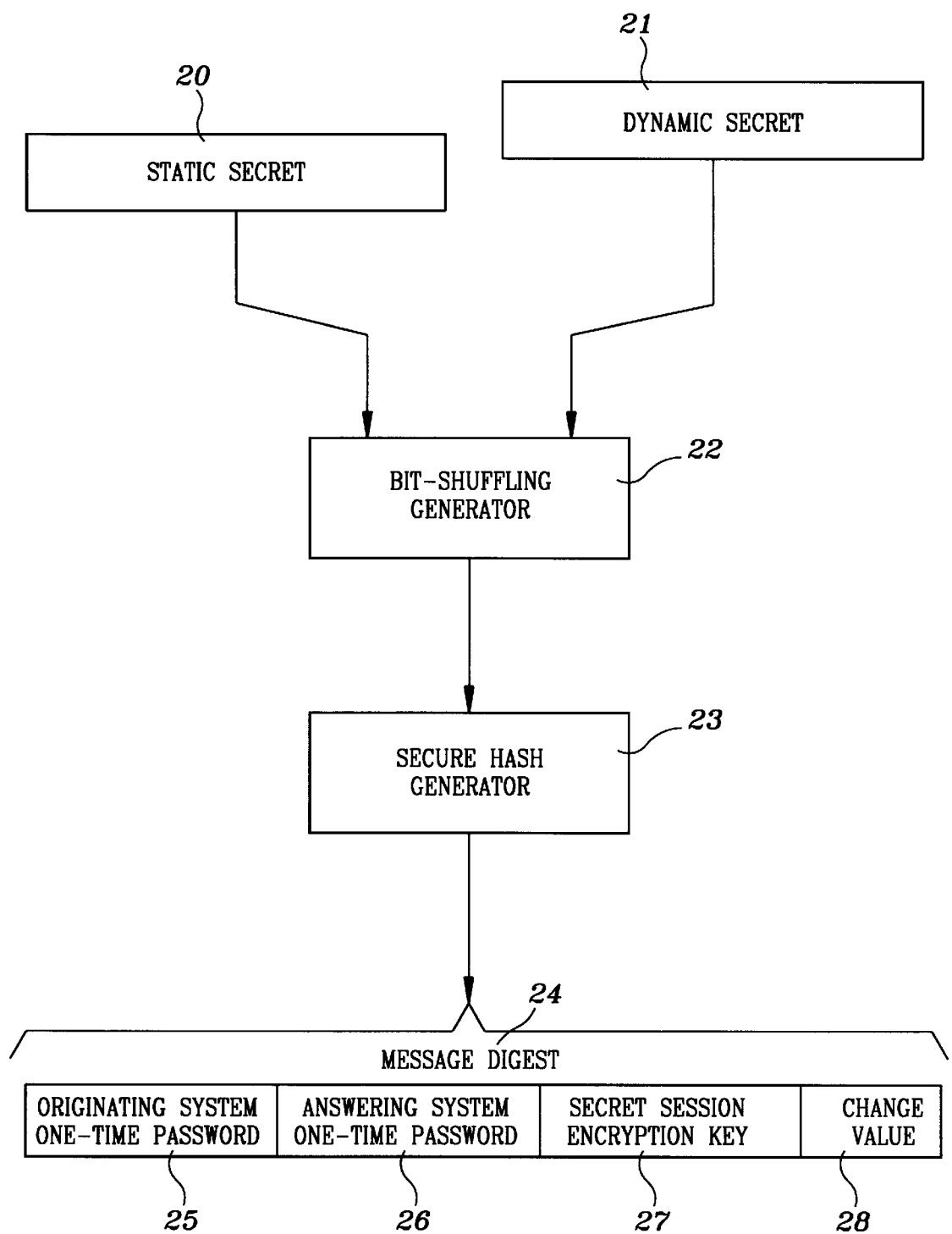
FIG. 2 is a graphic illustration of a logic process for generating message digests, and hence an originating system password, an answering system password, and a symmetric, deterministic but non-predictable encryption key.

Once in possession of the identifiers, the static secret and the dynamic secret, both of the computer systems independently commence to combine the secrets as illustrated in FIG. 2. Referring to FIG. 2, a graphic illustration of the ensuing computer process is presented with a plural bit static secret 20, and a plural bit dynamic secret 21, which are applied as inputs to a bit-shuffling generator 22. The bit-shuffling generator employs a many-to-few bit-mapping to shuffle the bits of the static and dynamic secrets. That is, the bits of the static secret and the dynamic secret are mixed to form a first pseudo-random result. The bit-shuffling algorithm continues to shuffle bits by wrapping the smaller of the inputs with the larger of the inputs until all bits of the larger input have been processed.

The process performed by the generator 22 may be comprised of any mathematical, encryption, or logic function including, by way of example and not limitation, A⊕B=C, where A is the static secret, B is the dynamic secret, and ⊕ denotes an exclusive OR logic function. The output of the generator 22 is a pseudo-random result which is applied as an input to a secure one-way hash generator 23 to produce a message digest 24. In the preferred embodiment of the invention, the hash function which is used by the generator 23 is the Secure Hash Algorithm (SHA) as defined in FIPS PUB 180-1 (Apr. 17, 1995).

For purposes of the invention, the message digest 24 is divided into four sectors. The first sector is an originating system password 25 which is used only one time, the second sector is an answering system password 26 which also is used only one time, the third sector is a secret session encryption key 27, and the fourth sector is a change value 28. The contents of each of the sectors comprising the message digest are pseudo-random numbers, which each of the computer systems 10 and 11 have produced independently without need for synchronization. Thus, computer system 10 has its own one-time password 25 and knows the one-time password 26 for the computer system 11. Further, each has the secret session encryption key 27 without any exchanges other than system IDs over a communication media.

Figure 3A:
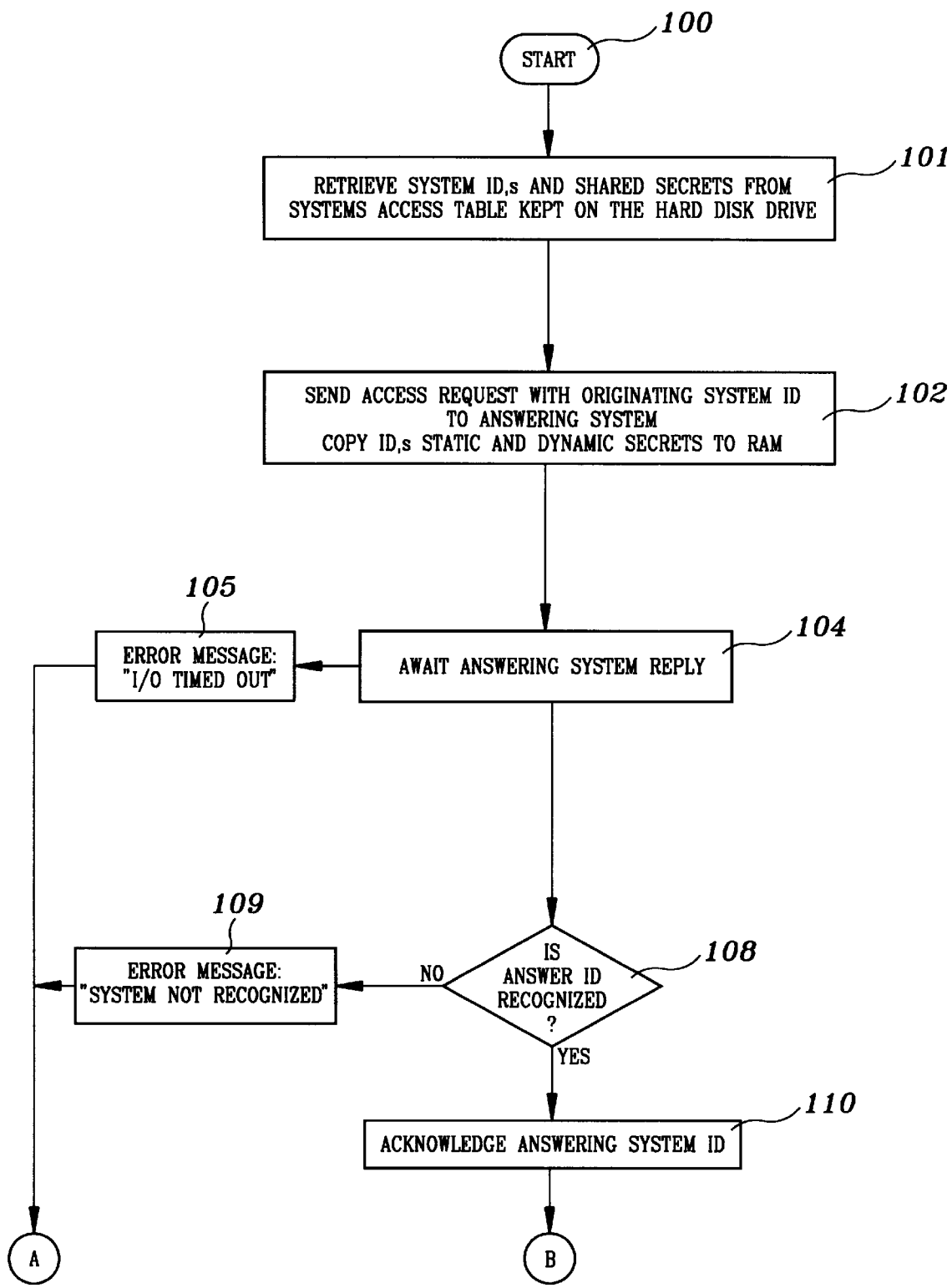
FIGS. 3a and 3b are a logic flow diagram of the application software used by an originating computer system in accordance with the invention.
Figure 3B:
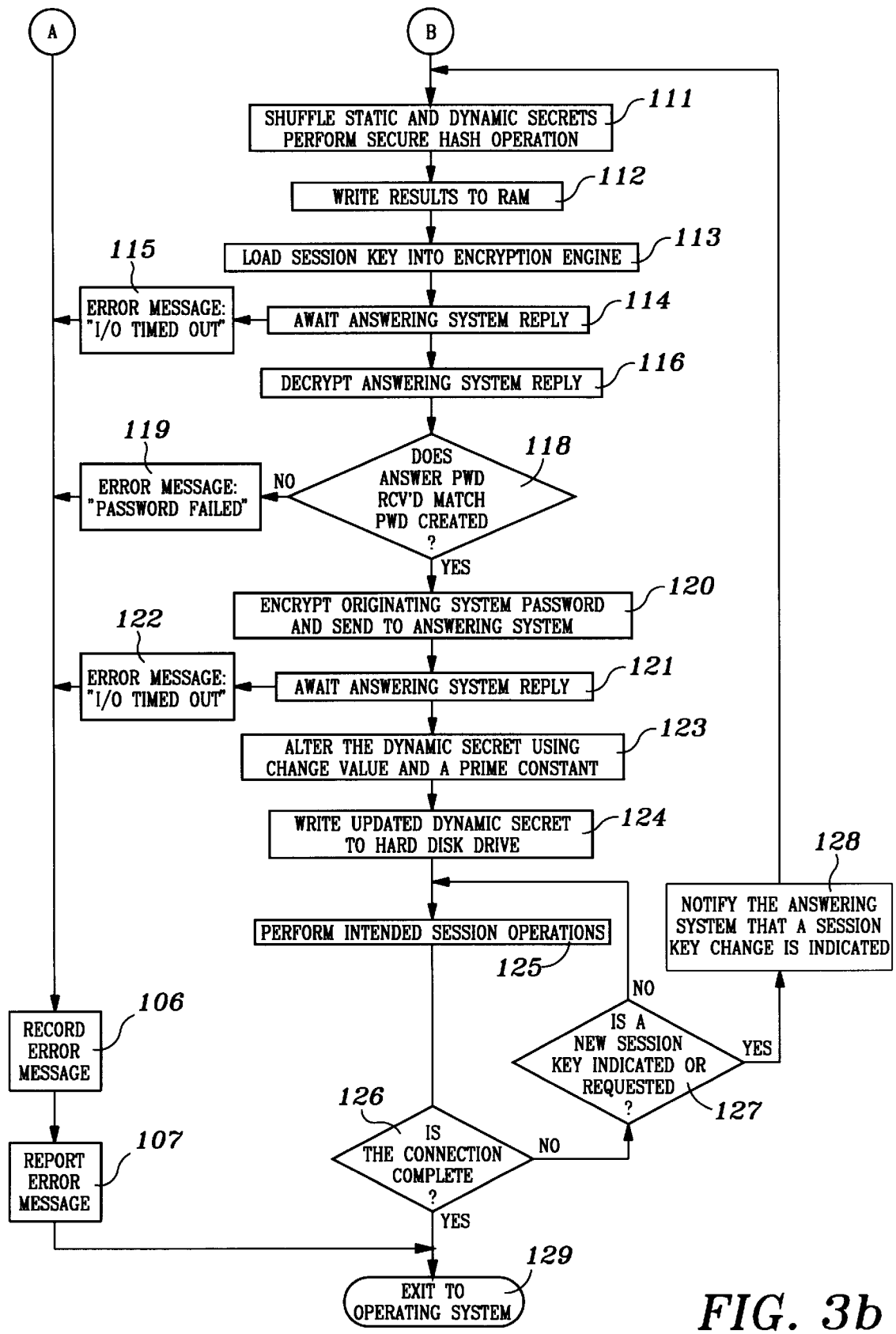

Referring to FIGS. 3a and 3b, the communication handshake protocol which is exercised by computer system 10 (originating system) is illustrated in the form of a logic flow diagram. The computer system 10 cycles through the logic flow diagram beginning with logic step 100. At logic step 101, the originating system retrieves the system IDs and secrets from a shared secrets table kept on the hard disk drive 5b. From logic step 101, flow continues to logic step 102 and an access request is sent with the originating system ID, and the IDs and shared secrets are written to RAM 1d. The static secret and dynamic secrets are retrieved from the hard disk drive 5b of the computer system 10 by using the targeted answering computer system ID as a tag.

Thereafter, the logic flow process proceeds to logic step 104 to await receipt of the computer system 11 ID. If the computer system 11 ID is not received within a predetermined time period, the logic flow process branches to logic step 105 where an "I/O Time Out" error message is generated. From logic step 105 the logic flow process continues by way of a connecting A to logic step 106 where a failed attempt record is updated, and then proceeds to logic step 107 where the error message is reported to the application program and the user.

If the computer system 11 ID is received before a time-out occurs at logic step 104, the table look-up ID for computer system 11 is compared at logic step 108 with the ID which has been received from the computer system 11. If a match does not occur, the logic flow process branches to logic step 109 where the error message "System Not Recognized" is generated. Thereafter, the logic flow process continues by way of connecting node A to logic step 106 as before described.

If a match occurs at logic step 108, however, the logic flow process proceeds to logic step 110 where the computer system 10 issues an acknowledgment of the answering system ID to the computer system 11. From logic step 110, the logic flow process proceeds by way of a connecting node B to a logic step 111, where the static secret and dynamic secret are combined by using a mathematical, encryption, or logic function employing a many-to-few bit-mapping. The bit-shuffling algorithm continues to shuffle bits by wrapping the smaller of the inputs with the larger of the inputs until all bits of the larger input have been processed. The bit-shuffling algorithm may be any mathematical, encryption, or logic function which will perform a bit-shuffle and/or a many-to-few bit-mapping on the two inputs. The pseudo-random result then is subjected to a secure one-way hash operation. The secure hash operation also employs a many-to-few bit-mapping to provide message digest 24, from which an originating system password 25, an answering system password 26, a secret session encryption key 27, and a change value 28 are extracted.

From logic step 111, the logic flow process continues to logic step 112, where the answer system ID, the originating system password 25, the answering system password 26, the secret session encryption key 27, and the change value 28 are written to RAM 1d of the computer system 10. The logic flow process then proceeds to logic step 113 where the secret session encryption key 27 is loaded into a user supplied encryption engine such as DES for encrypting all exchanges that occur thereafter between the computer system 10 and the computer system 11.

From logic step 113, the logic flow process continues to logic step 114 where the encrypted answering system password from computer system 11 is awaited. If the encrypted password is not received within a predetermined time period, an "I/O Timed Out" error message is generated at logic step 115 and the logic flow process then proceeds to logic step 106 as before described. If the encrypted password is received before a time-out occurs, however, the logic flow process continues from logic step 114 to logic step 116 where computer system 11's encrypted password is decrypted through use of the secret session encryption key 27 and continues to logic step 118. If the computer system 11 password as decrypted does not match the answering system password 26 which was generated at logic step 111, the logic flow process generates a "Password Failed" error message at logic step 119 and then continues to logic step 106 as before described. If a match occurs at logic step 118, however, the logic flow process continues from logic step 118 to logic step 120, where the originating system password 25 is encrypted by using the secret session encryption key 27 and transmitted over the communication link 12 to computer system 11. The logic flow process then proceeds to logic step 121 to await an answer from computer system 11 which indicates that the computer system access request has been granted.

If an access granted response is not received from the computer system 11 before a predetermined time period has expired, the logic flow process branches from logic step 121 to logic step 122 to generate an "I/O Time Out" error message and then continues to logic step 106 as before described. If an access granted response is received from computer system 11 before an I/O Time Out, however, the logic flow process continues from logic step 121 to logic step 123 where the dynamic secret 21 is altered by the change value 28 and a prime constant.

It is to be understood that the system IDs also may be altered by the change value 28 and the prime constant, or by another component of the message digest, to provide an additional layer of protection against playback imperson-ations. In a playback impersonation, a would-be attacker could monitor the cleartext exchange of system IDs between the originating system and the answering system, and thereafter attempt to impersonate one of the systems by using the previously used information. The alteration of the system IDs after each system connection is completed will prevent such playback impersonations.

From logic step 123, the logic flow process writes the updated dynamic secret into the non-volatile memory of hard disk drive 5b at logic step 124. Thereafter, the logic flow process continues to logic step 125 to use the current secret session encryption key to perform encrypted information exchanges with computer system 11 during the current session. Thereafter, a determination is made at logic step 126 whether the current system connection has been completed. If not, the logic flow process determines at logic step 127 whether a new secret session encryption key should be generated. If so, the logic flow process proceeds from logic step 127 to logic step 128, where the computer system 11 is notified that a secret session encryption key change is indicated. The logic flow process thereafter returns to the input of logic step 111 to continue as before described. If a determination is made at logic step 127 to not change the secret session encryption key, then the logic process proceeds to the input of logic step 125 to continue as before described.

It is to be understood that a secret session encryption key may be generated upon request, as well as automatically after a bilateral authentication occurs.

From either logic step 107 or logic step 126 when a connection has been completed, the logic flow process proceeds to logic step 129 to exit the program.

Figure 4A:
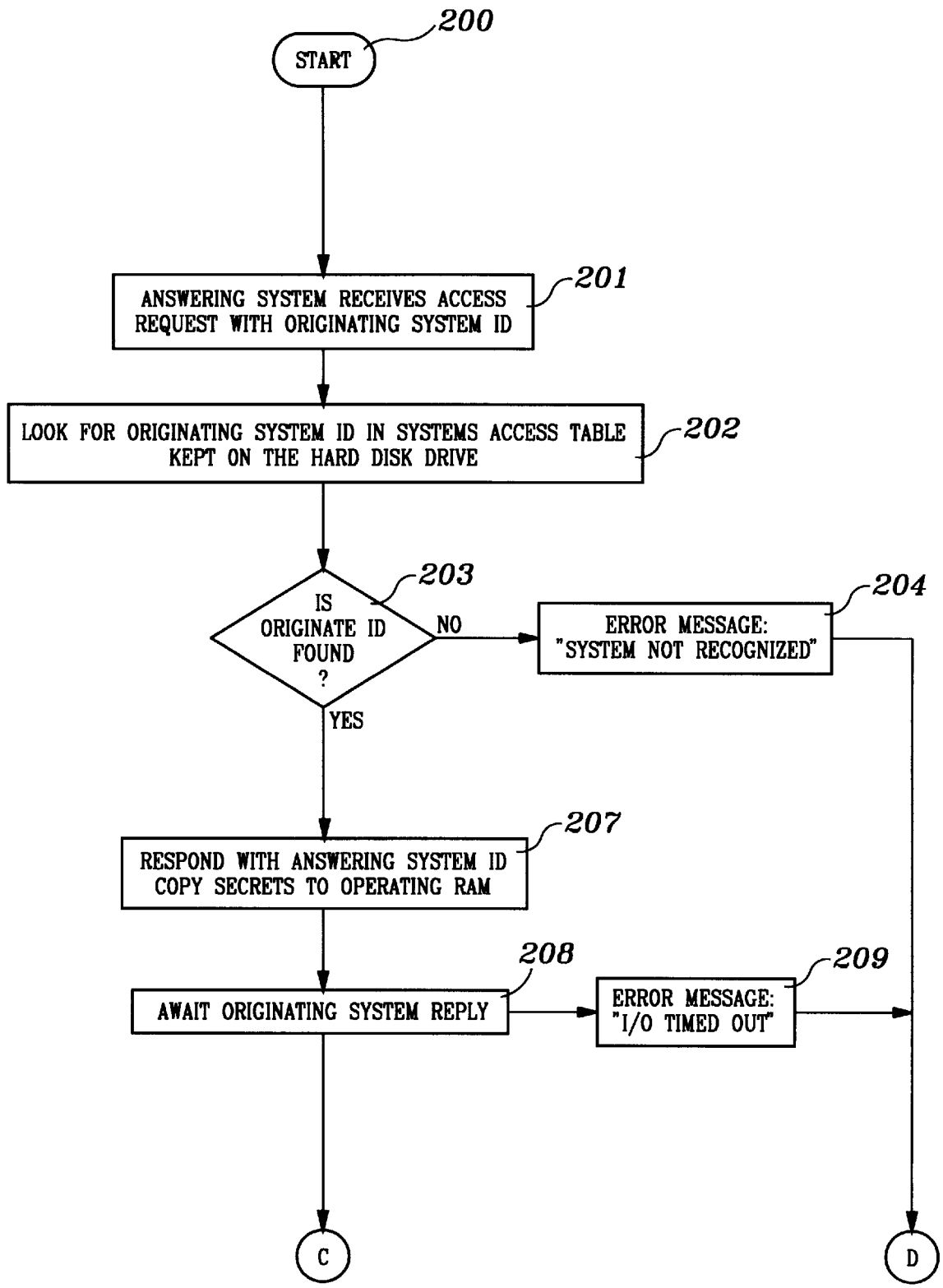
FIGS. 4a and 4b are a logic flow diagram of the application software used by an answering computer system in accordance with the invention.
Figure 4B:
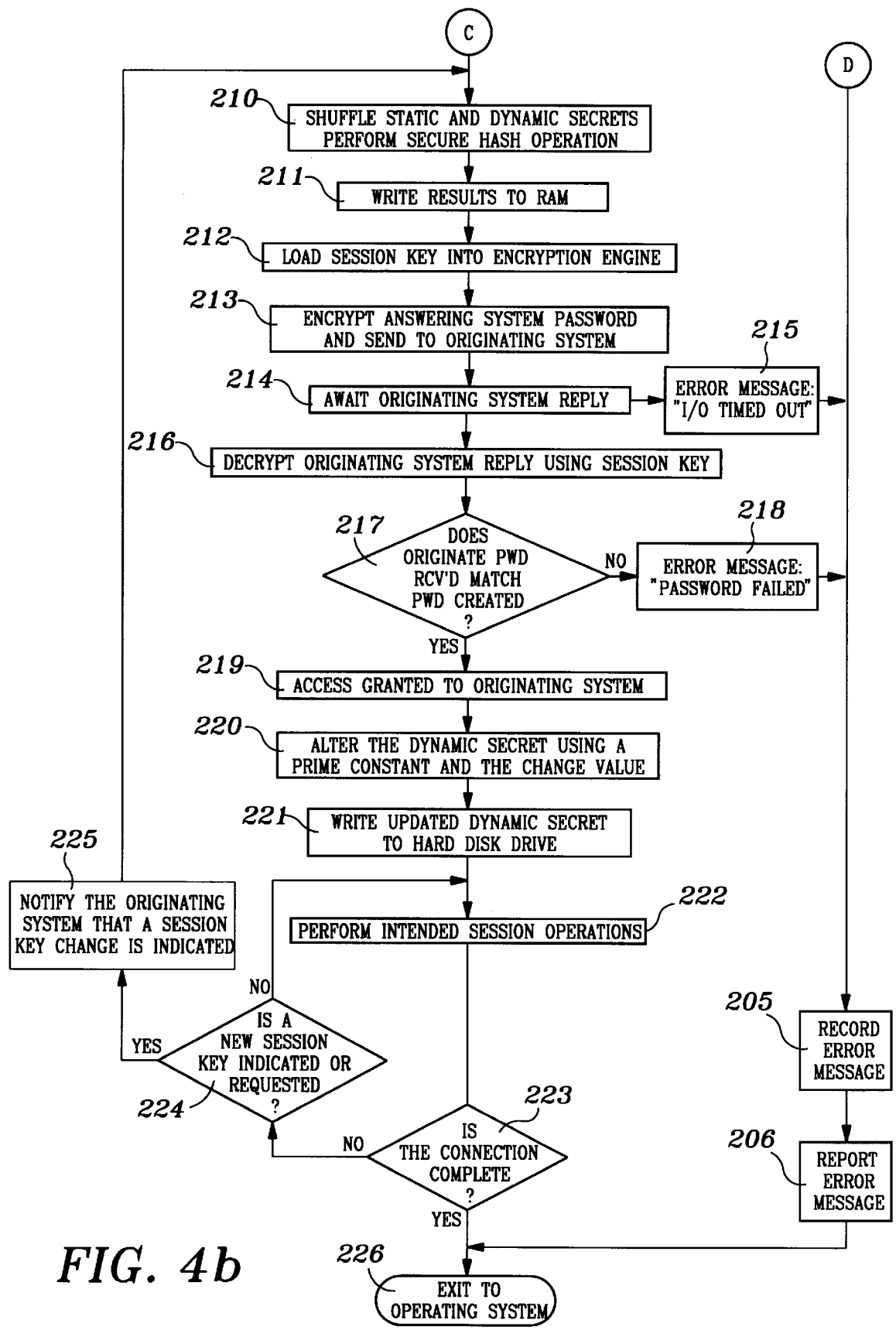

Concurrently with the above process, the answering system (computer system 11) independently executes the logic flow process illustrated in FIGS. 4a and 4b. More particularly, the logic flow process enters at logic step 200. Upon receipt of an access request and system identifier from computer system 10 at logic step 201, the logic flow process continues to logic step 202 to execute a search of an access table stored on the hard disk drive 17b to find the originating system ID and access the corresponding static and dynamic secrets. The originating system identifier supplied by the computer system 10 then is compared to the table look-up system identifiers at logic step 203. If no match occurs, the logic flow process branches to logic step 204 to generate a "System Not Recognized" error message. The logic flow process thereafter proceeds to logic step 205 of FIG. 4b to record the error message on the hard disk drive 17b, and thereafter report the error message to the application program and the user at logic step 206.

If the ID is found at logic step 203, however, the logic flow process continues to logic step 207 where the system identifier of the answering system is transmitted to the originating system, and the system IDs and the static and dynamic secrets are stored in RAM 13c. The logic flow process then proceeds to logic step 208 to await a response from the originating system indicating that the answering system identifier is acknowledged. If a response is not received from the originating system within a predetermined time period, a time-out occurs and the logic flow process branches to logic step 209 to generate the error message "I/O Timed Out". From logic step 209, the logic flow process proceeds by way of a connecting node D to logic step 205 of FIG. 4b where the process continues as before described.

If a response acknowledging the answering system's ID is received at logic step 208 before a time-out occurs, the logic flow process continues from logic step 208 through a connecting node C to logic step 210 of FIG. 4b, where the processor 13a uses the system identifier of the originating system 10 as a tag to find and acquire static and dynamic secrets stored in RAM 13c. The static and dynamic secrets thereafter are applied as inputs to a bit-shuffling algorithm which is a software program stored on hard disk drive 17b. The bit-shuffling algorithm continues to shuffle bits by wrapping the smaller of the inputs with the larger of the inputs until all bits of the larger input have been processed. The bit-shuffling algorithm may be any mathematical, encryption, or logic function which will perform a bit-shuffle operation and/or many-to-few bit-mapping on the two inputs. The result of the bit-shuffling operation then is subjected to a secure one-way hash operation, which performs a second many-to-few bit-mapping to produce a message digest. The originating system password 25, the answering system password 26, the secret session encryption key 27 and the change value 28 then are extracted from the message digest at logic step 211 and written to an area of RAM 13c.

The originating and answering systems have thus generated the same passwords, secret session encryption key, and change value without exchanging more than an access request and their respective system identifiers in cleartext.

From logic step 211 of FIG. 4b, the logic flow process continues to logic step 212, where the secret session encryption key 27 is loaded into an encryption engine supplied by the user. All exchanges between the computer system 10 and the computer system 11 which occur hereafter during this communication session are encrypted.

The logic flow process proceeds from logic step 212 to logic step 213, where the answering system password 26 is encrypted by using the encryption key 27 and transmitted to the originating system 10. Thereafter, the logic flow process at logic step 214 awaits the receipt of the encrypted originating system password 25 from computer system 10. If the encrypted password is not received before the expiration of a predetermined time period, the logic flow process branches from logic step 214 to logic step 215 to generate the error message "I/O Timed Out". Thereafter, the logic flow process proceeds to logic step 205, where the logic process continues as before described.

If an encrypted password is received from computer system 10 at logic step 214 before a time-out occurs, the logic flow process continues to logic step 216 where the secret session encryption key 27 is used to decrypt the password received from the originating system 10. Thereafter, the password received from the originating system is compared at logic step 217 with the originating system password 25 generated at logic step 210. If no match occurs at logic step 217, the logic flow process branches from logic step 217 to logic step 218 where the error message "Password Failed" is generated. The logic flow process then proceeds to logic step 205 where the logic process continues as before described.

The logic steps 111–120 of FIG. 3b and the logic steps 210–216 of FIG. 4b show that system password and system ID exchanges are encrypted.

Reference again is made to FIG. 4b. If a match occurs at logic step 217 the logic flow process proceeds to logic step 219 to transmit an access granted signal to the originating system. Thereafter, the dynamic secret stored in RAM 13c is altered by the change value 28 and a prime constant at logic step 220. From logic step 220 the logic process continues to logic step 221, where the updated dynamic secret is written into the non-volatile memory of hard disk drive 17b. From logic step 221 the logic flow process continues to logic step 222, where the secret session encryption key is used to encrypt information exchanged with the computer system 10 during the current session. Thereafter, a determination is made at logic step 223 whether the current system connection is complete. If not, the logic flow process determines at logic step 224 whether a new secret session encryption key should be generated. If not, the logic flow process returns to the input of logic step 222 to continue as before described. If the secret session encryption key is to be changed, however, the logic flow process proceeds from logic step 224 to logic step 225 to notify computer system 10 that a new secret session encryption key is indicated. Thereafter, the logic flow process returns to logic step 210 to continue as before described.

From logic step 206, or from logic step 223 after a system connection has been completed, the logic flow process exits the program at logic step 226.

From the above descriptions, it now should be evident that after a cleartext access request and exchange of system identifiers to perform a first bilateral authentication, all exchanges between the two computer systems are thereafter in ciphertext. That is, the exchange occurs only in an encrypted form. Further, while the static secret and the initial dynamic secret are known by each system, they are not exposed outside of the originating and answering systems. In addition, the passwords, dynamic secret, and secret session encryption key are used only during a current system connection. The dynamic secret is altered by a pseudo-random change value and prime number after each system connection, thus causing the message digest output of the secure hash algorithm to completely change from one pseudo-random number to another pseudo-random number. Further, the inputs to the secure hash algorithm are bit-shuffled and subjected to a first many-to-few bit-mapping prior to the secure hash generation, and subjected to a second many-to-few bit-mapping during the secure hash operation. Thus, any likelihood of the static secret or the current dynamic secret being discovered through either cryptographic analysis or brute force attack is made substantially remote to impossible. Further security enhancements by way of a second bilateral authentication occur in the exchange of encrypted passwords before encrypted information is exchanged. Lastly, system IDs also may be altered after each system connection to provide added protection against playback impersonation by would-be attackers.

The present invention has been particularly shown and described in detail with reference to preferred embodiments, which are merely illustrative of the principles of the invention and are not to be taken as limitations to its scope. Further, it will be readily understood by those skilled in the art that numerous changes and modifications may be made without departing from the spirit of the invention. For example, the change value resulting from the generation of a message digest may be used to alter not only the dynamic secret, but also the system IDs. Further, instead of using a component of the message digest as a change value, the pseudo-random input to the secure hash generator could be used. As another example, the message digest could be split into more than four components, or less than four components with the pseudo-random input to the secure hash generator being used to provide those components not supplied by the message digest. In addition, the originating system and the answering system could use different components of the message digest as the encryption key, and thus operate in a full duplex mode requiring twice the effort to penetrate both sides of an information exchange. In yet another example, multiple passes of the logic flow illustrated in FIG. 2 could be made to generate a message digest with encryption key components of ever increasing bit lengths. Still further, separate components of the pseudo-random input to the secure hash generator could be used to alter the static and dynamic secrets, thus making both secrets dynamic, while a message digest component could be used to alter system IDs. Also, two bit shuffles could be used in the logic flow of FIG. 2, with a component of the pseudo-random output of the first bit shuffle being used to alter the static secret (now second dynamic secret), a component of the pseudo-random output of the second bit shuffle being used to alter the dynamic secret, and a component of the message digest being used to alter system IDs.

What is claimed is:

1. A network system for secure exchange of files and data, which comprises:

an originating system having stored therein n answering system IDs, n static secrets, n dynamic secrets, a first many-to-few bit mapping program, a second many-to-few bit mapping program, and having means for generating a pseudo-random message digest comprised of an originating system password, a first answering system password, a session encryption key, and a change value by applying said first many-to-few bit mapping program and said second many-to-few bit mapping program to one of said n static secrets and to one of said n dynamic secrets, for verifying authenticity of both an answering system ID through comparison with said n answering system IDs and a second answering system password through comparison with said first answering system password, for generating said pseudo-random message digest and a first acknowledgment of verification upon verification of authenticity of said answering system ID, for altering said one of said n dynamic secrets with said change value upon verification of authenticity of said second answering system password, for decrypting an encrypted answering system password with said session encryption key to provide said second answering system password, encrypting said originating system password to generate an encrypted originating system password, and upon receipt of a second acknowledgment of authenticity verifying said originating system password, encrypting an information file with said session encryption key for transfer over said network system during a system connection;

communication link means in electrical communication with said originating system for accommodating information transfers over said network system; and an answering system in electrical communication with said communication link means and having stored therein n originating system IDs, said answering system ID, said n static secrets, said n dynamic secrets, said first many-to-few bit mapping program, said second many-to-few bit mapping program, and said means for generating said pseudo-random message digest comprised of said originating system password, said answering system password, said session encryption key, and said change value, and upon verifying authenticity of said originating system ID transferring said answering system ID over said communication link means to said originating system, and upon receiving said first acknowledgment of verification of authenticity of said answering system ID from said originating system over said communication link means, generating said pseudo-random message digest and encrypting said answering system password with said session encryption key to provide said encrypted answering system password over said communication link means to said originating system, and upon receipt of said encrypted originating system password from said originating system by way of said communication link means, decrypting said encrypted originating system password with said session encryption key to verify authenticity of said originating system password, and upon verification of authenticity of said originating system password, issuing said second acknowledgment of authenticity over said communication link means to said originating system.

2. The network system of claim 1, wherein said encryption key is a deterministic, non-predictable, pseudo-random and symmetric encryption key.

3. The network system of claim 1, wherein said first many-to-few mapping program is an algebraic function program.

4. The network system of claim 1, wherein said first many-to-few bit mapping program is a logic function program.

5. The network system of claim 1, wherein said first many-to-few bit mapping program is an encryption program.

6. The network system of claim 1, wherein said first many-to-few bit mapping program consists of plural bit shuffling programs.

7. The network system of claim 1, wherein said second many-to-few bit mapping program is a secure hash algorithm (SHA) function.

8. The network system of claim 1, wherein said second many-to-few bit mapping program is an encryption program.

9. The network system of claim 1, wherein said second many-to-few bit mapping program consists of plural encryption programs.

10. The network system of claim 1, wherein said pseudo-random message digest is used only during a single system connection.

11. A method of providing a secure exchange of information between an originating system having a first system ID and an answering system having a second system ID, and each of said originating system and said answering system having a static secret and a dynamic secret, which comprises:

performing a first bilateral authentication by said originating system and said answering system exchanging and verifying said first system ID and said second system ID;

each of said originating system and said answering system executing a bit-shuffle operand and a secure hash operand with plural bit-mappings to form a pseudo-random message digest from said static secret and said dynamic secret;

each of said originating system and said answering system extracting an originating system password, an answering system password, a deterministic and symmetric encryption key, and a change value from said message digest;

said originating system and said answering system respectively encrypting said originating system password and said answering system password with said deterministic and symmetric encryption key, and respectively transmitting a first encrypted password and a second encrypted password over said communication link;

said answering system and said originating system respectively receiving and decrypting said first encrypted password and said second encrypted password with said deterministic and symmetric encryption key, and respectively verifying said originating system password and said answering system password to perform a second bilateral authentication;

said originating system and said answering system each altering said dynamic secret with said change value and a prime constant;

said originating system and said answering system each encrypting said information with said deterministic and symmetric encryption key, and exchanging encrypted information over said communication link;

said originating system and said answering system repeating immediately above step until all sessions in a system connection between said originating system and said answering system are completed; and said originating system and said answering system repeating all of the above steps upon either generating a new access request to the other.

12. The method set forth in claim 11 above, wherein said answering system password, said originating system password, said deterministic and symmetric encryption key, and said change value are pseudo-random.

13. The method set forth in claim 11 above, wherein said deterministic and symmetric encryption key is also non-predictable.

14. A method of authenticating an originating system and an answering system in electrical communication by way of a communication link, and protecting information files to be exchanged over said communication link, with minimal contribution to system overhead and system latency, which comprises the steps of:

said originating system transmitting an access request over said communication link to said answering system;

said originating system and said answering system exchanging and verifying system IDs received over said communication link to perform a first bilateral system authentication;

said originating system and said answering system independently combining a static secret and a dynamic secret by executing a first operand which performs a first many-to-few bit mapping to generate a first pseudo-random result;

said originating system and said answering system independently executing a secure hash operand on said first pseudo-random result to perform a second many-to-few bit-mapping and generate a second pseudo-random result;

said originating system and said answering system independently extracting an originating system password, an answering system password, a secret session encryption key, and a change value from said second pseudo-random result;

said originating system transmitting said originating system password over said communication link to said answering system, and verifying said answering system password received over said communication link from said answering system;

said answering system transmitting said answering system password over said communication link to said originating system, and verifying said originating system password received over said communication link from said originating system to perform a second bilateral system authentication;

said originating system and said answering system independently altering said dynamic secret with said change value and a prime constant upon conclusion of a system connection between said originating system and said answering system to generate an updated dynamic secret, and replacing said dynamic secret with said updated dynamic secret; and said originating system and said answering system independently encrypting said information files through use of said secret session encryption key and transmitting encrypted ones of said information files over said communication link;

repeating immediately above step until all sessions in said system connection are completed, and thereafter repeating all above steps upon either of said originating system and said answering system generating a new access request to the other.

15. The method of claim 14, wherein said dynamic secret, said originating system password, said answering system password, and said secret session encryption key are changed upon completion of said system connection.

16. The method of claim 14, wherein said secret session encryption key is a deterministic, non-predictable, pseudo random, symmetric encryption key.

17. The method of claim 14, wherein said system IDs are used as tags to look up said static secret and said dynamic secret in an originating system memory and an answering system memory.

18. The method set forth in claim 14, wherein said change value is combined with said prime constant to ensure that said dynamic secret is never altered by zero.

19. The method set forth in claim 14, wherein said dynamic secret is changed each time said second bilateral system authentication occurs.

20. A method of authenticating an originating system and an answering system in electrical communication by way of a communication link, and protecting information files to be exchanged over said communication link with minimal contribution to system overhead and system latency, which comprises the steps of:

transmitting an access request and a first system ID from said originating system to said answering system;

verifying said first system ID at said answering system;

transmitting a second system ID from said answering system to said originating system;

verifying said second system ID at said originating system;

transmitting an acknowledgment of verification of said second system ID from said originating system to said answering system;

said originating system and said answering system independently combining a static secret and a dynamic secret with a first function to shuffle all bits in said static secret and said dynamic secret, and perform a first many-to-few bit-mapping to produce a first pseudo-random result;

said originating system and said answering system independently secure hashing said first pseudo-random result with a secure hash algorithm to perform a second many-to-few bit-mapping to produce a second pseudo-random result;

said originating system and said answering system independently extracting an originating system password, an answering system password, a secret session encryption key, and a change value from said second pseudo-random result;

encrypting said answering system password with said secret session encryption key by said answering system to generate a first encrypted password;

transmitting said first encrypted password from said answering system to said originating system;

decrypting and verifying said first encrypted password by said originating system;

encrypting said originating system password with said secret session encryption key by said originating system to generate a second encrypted password;

transmitting said second encrypted password from said originating system to said answering system;

decrypting and verifying said second encrypted password by said answering system;

said originating system and said answering system independently altering said dynamic secret with said change value and a prime constant to produce a second dynamic secret;

said originating system and said answering system each replacing said dynamic secret with said second dynamic secret;

said originating system and said answering system each using said secret session encryption key to encrypt said information files and thereby form encrypted files;

said originating system and said answering system thereafter exchanging said encrypted files; and upon completion of all sessions occurring during a current system connection, said originating system and said answering system independently repeating all above steps upon either generating a new access request to the other.

21. The method of claim 20, wherein said first system ID, said second system ID, and said dynamic secret are altered each time all authentication cycles for a system connection are completed.

22. A method of authenticating an originating system and an answering system in electrical communication by way of a communication link, and protecting information files to be exchanged over said communication link, which comprises the steps of:

said originating system and said answering system performing a first bilateral authentication by verifying system IDs of said originating system and said answering system;

upon successful completion of said first bilateral authentication, said originating system and said answering system having secret inputs and independently generating therefrom a pseudo-random message digest having an originating system password, an answering system password, a secret session encryption key, and a change value;

said originating system and said answering system performing a second bilateral authentication by respectively encrypting said originating system password and said answering system password with said secret session encryption key, and thereafter exchanging encrypted forms of said originating system password and said answering system password over said communication link for verification;

said originating system and said answering system each altering at least one of said secret inputs with said change value and using said secret session encryption key to encrypt said information files to form encrypted files to be transferred over said communication link during one or more sessions of a system connection; and said originating system and said answering system each notifying other after each of said one or more sessions whether a new secret session encryption key is required, and if so repeating all but said first bilateral authentication of above steps.

23. The method of claim 22, wherein the step of updating occurs upon completion of a system session.

24. The method of claim 23, further including the step of said originating system and said answering system erasing said originating system password, said answering system password, and said secret session encryption key at end of said system connection.

25. The method of claim 22, wherein said step of updating occurs upon a request being generated by one of said originating system and said answering system.

26. The method of claim 22, wherein the step of said originating system and said answering system having secret inputs and generating therefrom a pseudo-random message digest is repeated n times to create a message digest of increased bit lengths.

27. The method of claim 22, including the step of said originating system and said answering system each altering its system ID when altering at least one of said secret inputs with said change value.

* * * * *